J. J. COWELL.

Sash Balances.

No. 5,717. Reissued Jan. 6, 1874.

*Witnesses.*

Oliver Drake,
Chas Bonnell.

*Inventor:*

John J Cowell.
per
Wm M Leggett, Atty.

AM. PHOTO-LITHOGRAPHIC Co. N.Y. (OSBORNE'S PROCESS)

UNITED STATES PATENT OFFICE.

JOHN J. COWELL, OF NEWARK, NEW JERSEY.

IMPROVEMENT IN SASH-BALANCES.

Specification forming part of Letters Patent No. 136,366, dated March 4, 1873; reissue No. 5,717, dated January 6, 1874; application filed April 23, 1873.

*To all whom it may concern:*

Figure 1:
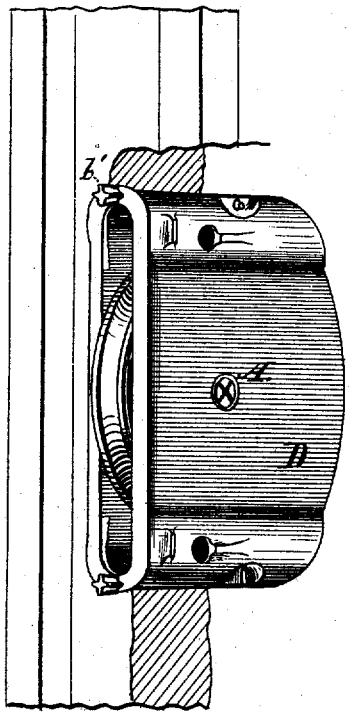
Figure 2:
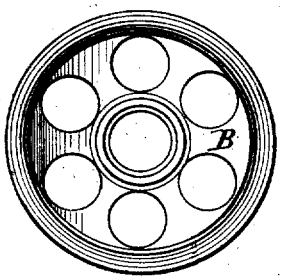
Figure 3:
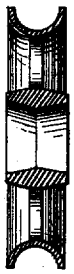
Figure 4:
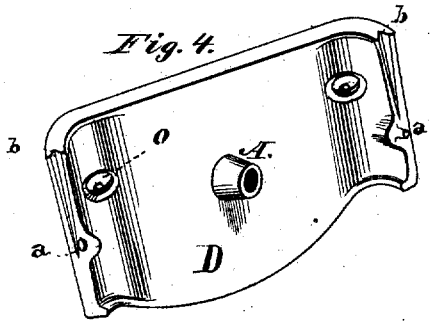
Figure 5:
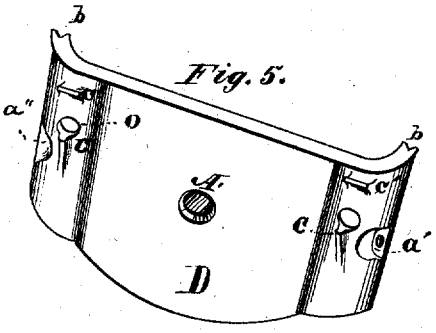

Be it known that I, JOHN J. COWELL, of Newark, in the county of Essex and State of New Jersey, have invented certain Improvements in Sash-Balances, of which the following is a specification:

This invention relates to the construction of sash-pulleys. Its object and mode of operation are hereinafter fully described. It consists, first, in casting the sheave-case or cheeks of the pulley in two dished pieces of metal, having spurs on the outer sides thereof, and holes therein in rear of the said spurs. These holes are so placed in order that the spurs, while projecting forward, may yet be drawn with facility from the mold; second, in the employment of peculiarly-shaped wedges and corresponding recesses in the edges of the cheeks of the pulley, which are intended for spreading the cheeks apart, in order to "bind" the sheave-case in the mortise in the window-frame; third, in the peculiar construction of the journal for the sheave of the pulley. This journal is formed by casting one, either hollow or solid, truncated cone upon each of the inner sides of the two cheeks forming the sheave-case or pulley. The sheave is cast with a hole through its axis corresponding in shape to these two truncated cones—that is, the edges of this hole taper from the center of the sheave outwardly to its sides, which are in close proximity to the inner sides of the dished cheeks—as is clearly shown in Fig. 3 of the accompanying drawing forming part of this specification. When the cheeks are brought together to form the sheave-case, the sheave is journaled between them on the aforesaid two truncated cones, which fit into the aforesaid doubly-tapered hole in the axis of the sheave, and by their juxtaposition form one doubly-conical journal, upon which the sheave revolves. Through this journal, when hollow, a pin is inserted, which may be riveted over on one or both ends, thereby binding the two cheeks of the pulley to each other in the center. Steady-pins and corresponding holes are cast on and in opposite edges of the dished cheeks of the pulley. This method of constructing this doubly-conical journal hollow, and with a rivet through its axis, may well be adapted to other sheaves than those in sash-pulleys—as, for instance, it may be applied to the sheaves of ceiling-pulleys, and to trunk or furniture casters.

In the figures of the drawing above mentioned, A A are truncated cones. B is the sheave, having a doubly-tapered hole, as above described, through its axis. D D are the two dished cheeks of the pulley. *a a'* are the steady-pins and their corresponding holes in the edges of the dished cheeks D D. *b b* are fluted or corrugated recesses in the opposite edges of the cheeks, in which the wedges *b' b'* are inserted. The shape of these wedges in transverse section somewhat resembles a cross. *c c* are spurs cast on the outer sides of the cheeks, and having the holes *o* in their rear through the metal of the cheeks. These holes, as above mentioned, facilitate the withdrawal of the spurs *c* from the mold. *c' c'* are lugs, also cast on the outer sides of the cheeks.

By driving the wedges *b' b'* into the holes formed by the junction of the edges of the recesses *b b*, the cheeks of the pulley are spread apart, and the spurs *c c* and lugs *c' c'* are thus driven into the wood forming the sides of the mortise in which the case is inserted, thereby firmly securing the pulley in the mortise. The steady-pins *a a*, in entering their corresponding holes *a' a'*, interlock the cheeks of the pulley, and prevent any motion or oscillation of the cheeks around the doubly-conical hollow journal A A, and thereby prevent any tendency in the wedges *b' b'* to work loose or back out of their fluted recesses, which they would do if such oscillation were allowed to take place.

As my invention I claim—

1. In a sash-pulley, the dished cheeks D D, constructed of cast metal, and provided with spurs *c c* and holes *o o* in the rear of said spurs, in order that the spurs, while projecting forward, may yet be drawn from the mold, all substantially as and for the purposes described.

2. In a sash-pulley, the combination, with the sheave thereof, of two truncated cones, A A, one of each cast upon the inner sides of the two dished cheeks of the pulley, and forming by their juxtaposition, when the sheave-case is closed, one doubly-conical journal for the sheave, conformed to said journal and revolving thereon, in the manner substantially as described, for the purposes set forth.

3. In a sash-pulley, the combination of the wedges $b'$ $b'$ and their corresponding recessed flutings or corrugations $b$ $b$ with the lugs $c'$ $c'$, in the manner substantially as described, for the purposes set forth.

4. In a sash-pulley, the combination of the steady-pins $a$ $a$, provided with corresponding holes $a'$ $a'$ in the opposite edge of the dished cheek of the pulley, with the wedges $b'$ $b'$ and their corresponding recessed flutings or corrugations $b$ $b$, in the manner substantially as described, and for the purposes set forth.

JOHN J. COWELL.

Witnesses:
OLIVER DRAKE,
JOHN W. COLLINS.